United States Patent [19]
Cwycyshyn et al.

[11] 3,869,144
[45] Mar. 4, 1975

[54] LATCHING MECHANISM FOR SECURING A VEHICLE TO A TRANSPORTER

[75] Inventors: Walter Cwycyshyn, Detroit; Anthony Buccellato, Grosse Pointe Woods, both of Mich.

[73] Assignee: General Motors Corporation, Detroit, Mich.

[22] Filed: Nov. 9, 1973

[21] Appl. No.: 414,334

[52] U.S. Cl. ...... 280/179 R, 105/368 R, 248/361 R
[51] Int. Cl. ................................. B 60p 7/08
[58] Field of Search .......... 280/179 R; 248/361 R; 105/368 R

[56] References Cited
UNITED STATES PATENTS

| | | | |
|---|---|---|---|
| 3,739,906 | 6/1973 | Cwycyshyn et al. | 105/368 R X |
| 3,785,601 | 1/1974 | Kitchen et al. | 248/361 R X |
| 3,794,350 | 2/1974 | Cwycyshyn et al. | 280/179 R |

Primary Examiner—David Schonberg
Assistant Examiner—Michael J. Forman
Attorney, Agent, or Firm—Edward J. Biskup

[57] ABSTRACT

A latching mechanism incorporated with a vehicle positioning and restraint apparatus for locking in position a tie-down device attached to the underside of the vehicle. The latching mechanism is characterized by having a pivoted member that is adapted to apply a force to a portion of the tie-down device and cause the latter to be pressed against the vehicle frame and the guide rail.

3 Claims, 4 Drawing Figures 3,869,144

LATCHING MECHANISM FOR SECURING A VEHICLE TO A TRANSPORTER

Copending patent application Ser. No. 311,400, now U.S. Pat. No. 3,794,350 entitled "Device For Securing Vehicle To Transporter," filed Dec. 1, 1972, and assigned to the assignee of this invention, discloses a positioning and restraint apparatus which permits a vehicle to be mechanically loaded into an enclosed carrier, positively located in a predetermined position, and secured to the floor of the carrier in a manner which prevents vertical, lateral, and longitudinal movement of the vehicle. The vehicle is provided with three tie-down devices which cooperate with three elongated parallel guide rails for restraining the vehicle from movement in a vertical and lateral direction. In addition, a latching mechanism is provided with each of the outboard guide rails for locking the rear tie-down devices in a fixed position so as to preclude movement of the vehicle along the longitudinal axis of the rails.

Each of the rear tie-down devices associated with the apparatus described above has a body portion which has its upper end formed with a projecting horizontal mounting member that is adapted to be received by an aperture in the side of the frame while the lower end of the body portion has a shoe member with laterally spaced outwardly extending arms which are adapted to be received by the guide rail. When using a tie-down device of the above-described type, it has been found important to maintain the mounting member securely within the accommodating aperture in the frame. Otherwise, relative sidewise movement can occur between the frame and tie-down device that could result in damage to the vehicle.

Accordingly, the present invention contemplates a latching mechanism that includes a movable member that is adapted to engage the tie-down device on the side opposite the projecting mounting member so as to force the body of the tie-down device physically against the frame and at the same time press the shoe member into contact with the guide rail and thereby provide a rigid attachment for the vehicle that securely retains the latter during shipment. In the preferred form, the latching mechanism made according to the invention comprises a base member located adjacent the guide rail that carries a lock lever. The lock lever is formed with a U-shaped opening which defines a pair of stop surfaces and the arrangement is such that when the lock lever is in a first position, the stop surfaces are located fore and aft of the tie-down device so that the latter is restrained from movement along the longitudinal axis of the guide rail and when the lock lever is in a second position the stop surfaces are positioned laterally from the tie-down device so the latter is able to move along the aforementioned longitudinal axis. In addition, a wedge-shaped member is mounted on the lock lever for engaging the tie-down device and causing the latter to be forced against the side of the frame to maintain the latter in a fixed position when the lock lever is in the first position.

The objects of the present invention are to provide a latching mechanism which is adapted to press a tie-down device laterally into physical contact with the side of a vehicle frame so as to restrain the latter from movement; to provide a latching mechanism having a lock lever which carries a wedge-shaped member which forcibly moves a tie-down device into engagement with a vehicle frame and with a guide rail and maintains such engagement under pressure so that the tie-down device is restrained from movement; and to provide a latching mechanism having pivoted means formed therewith for providing movement of a vehicle tie-down device in two directions so as to cause the latter to be restrained from movement relative to a guide rail.

Other objects and advantages of the present invention will be apparent from the following detailed description when taken with the drawings in which.

Figure 1:
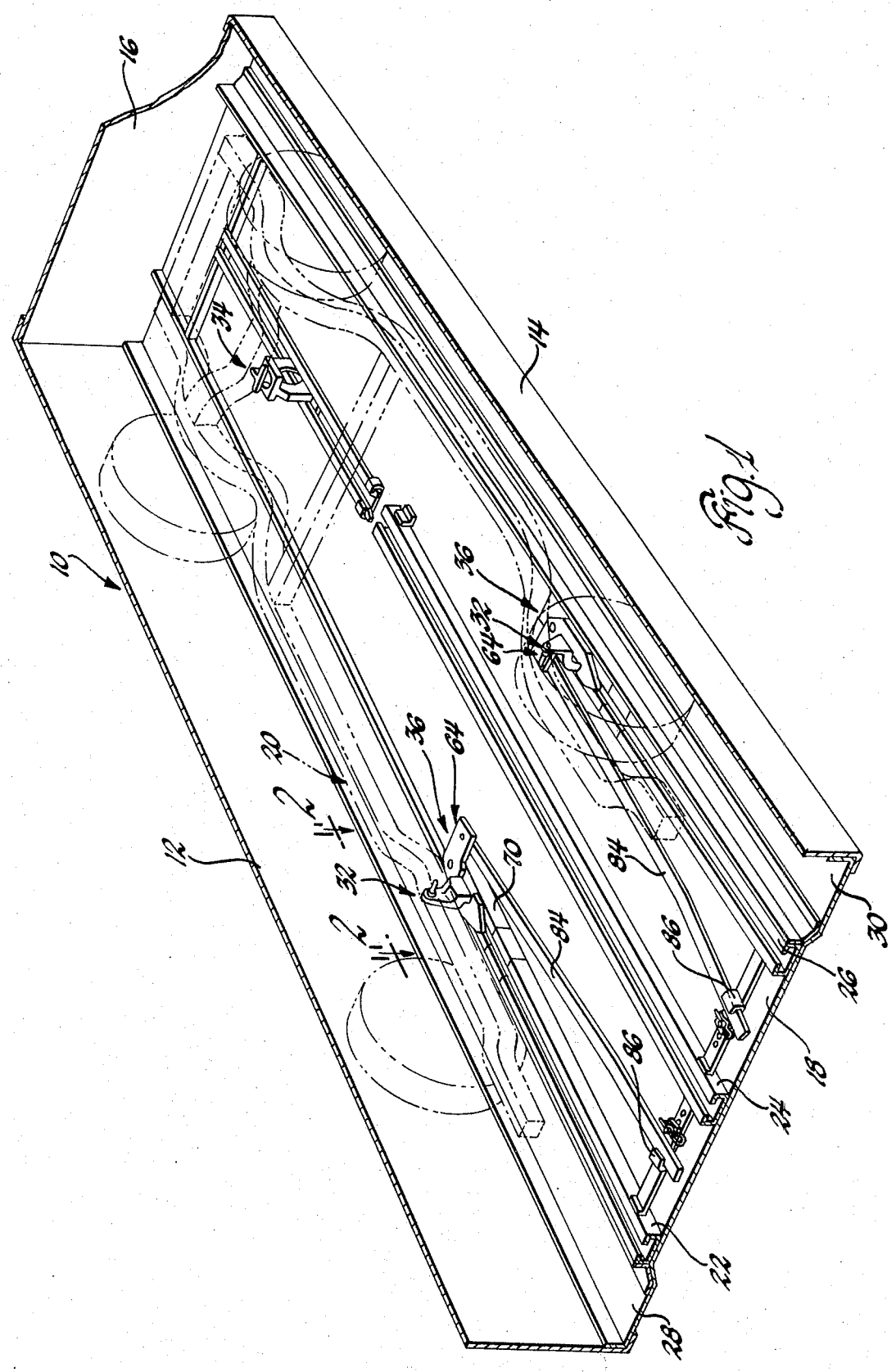
FIG. 1 is a perspective view showing a part of a shipping container incorporating a positioning and restraint apparatus which supports a vehicle using rear tie-down devices and a latching mechanism made according to the invention.

Referring to the drawings and more particularly FIG. 1 thereof, a shipping container 10 is shown comprising side walls 12 and 14 an end wall 16, and a floor portion 18. This shipping container is similar to the one illustrated in the aformentioned patent application and is intended to have multiple decks or floor portions, each of which is adapted to accommodate a vehicle, the frame 20 of which is shown in phantom lines. A positioning and restraint apparatus is incorporated with each floor portion 18 of the shipping container 10 for holding the vehicle in place when the shipping container is in transit on a carrier such as a railway car.

In this regard, it will be noted that the positioning and restraint apparatus comprises three elongated guide rails 22, 24 and 26 which are located in parallel planes with equal spacing between adjacent guide rails. Each guide rail is a channel member which in cross section is C-shaped and is fixedly secured to a raised planar portion of floor portion 18 which includes parallel tracks 28 and 30 located adjacent the side walls 12 and 14. As should be apparent, the tracks 28 and 30 serve to acccommodate the tires of the vehicle as the latter moves into the shipping container 10.

Figure 2:
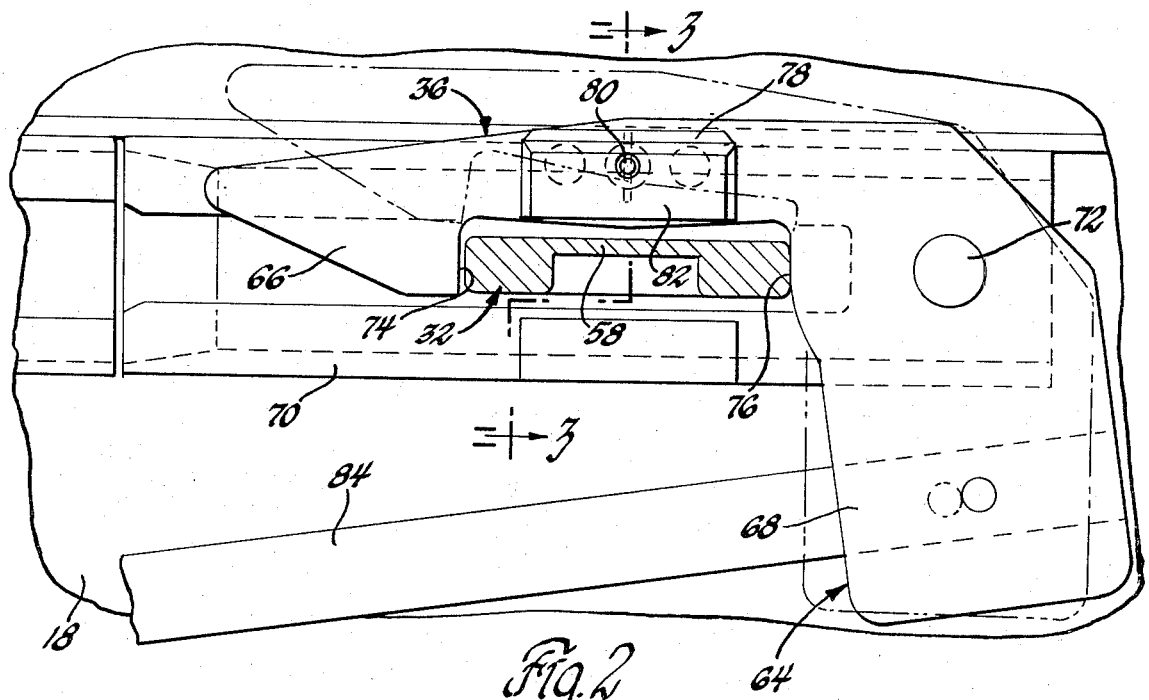
FIG. 2 is an enlarged plan view showing one of the latching mechanisms according to this invention taken on line 2—2 of FIG. 1.
Figures 3, 4:
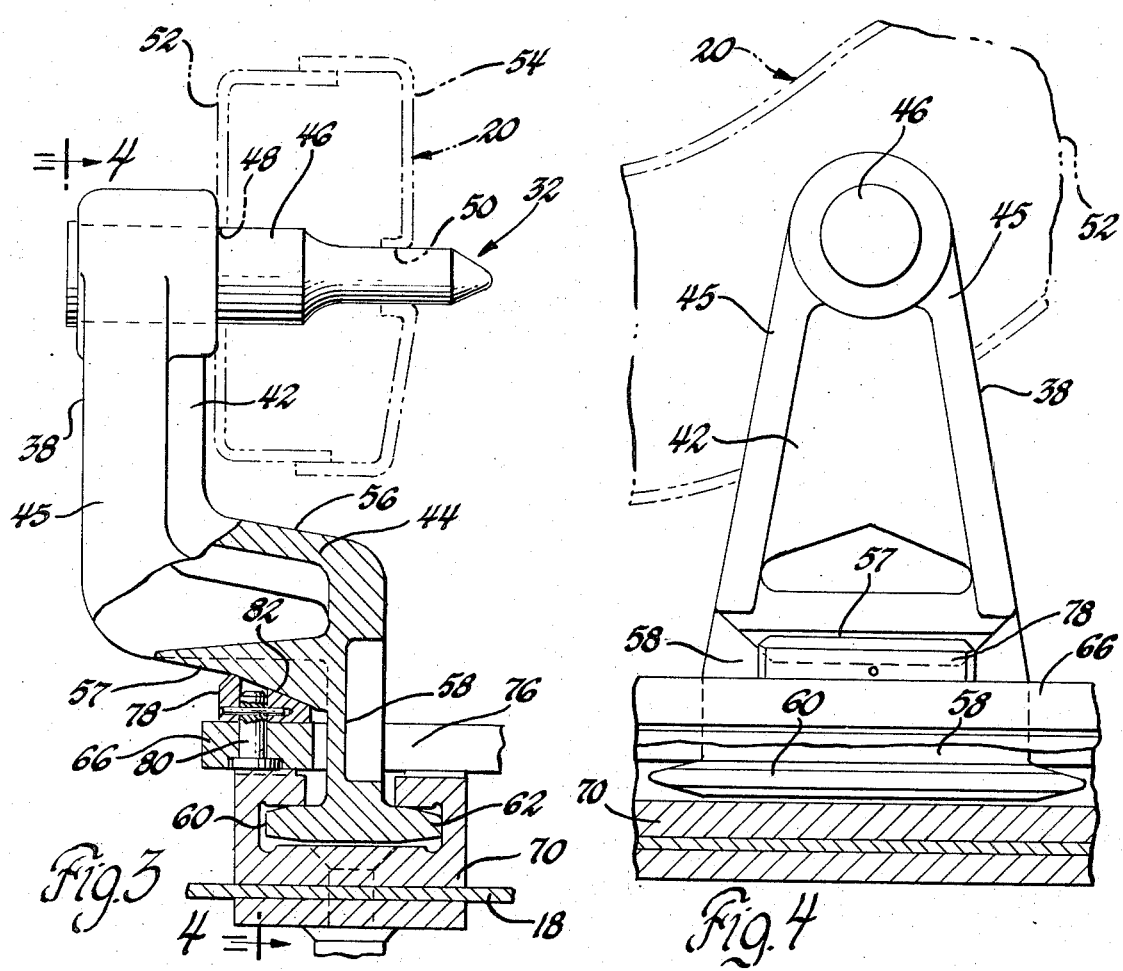
FIG. 3 is a view taken on line 3—3 of FIG. 2.
FIG. 4 is a view taken on line 4—4 of FIG. 3.

Each of the outer guide rails 22 and 26 is adapted to receive an identical tie-down device 32 as shown in FIGS. 2, 3 and 4, while the center guide rail 24 is adapted to receive a tie-down device 34. In other words, as seen in FIG. 1, three tie-down devices are adapted to be attached to the vehicle frame 20 so as the vehicle is rolled into the open end of the shipping container 10, the tires are accommodated by the tracks 28 and 30 and each of the tie-down devices slides within one of the guide rails and serves to position the vehicle as well as prevent any substantial lateral and vertical movement thereof. Also, each outer guide rail 22 and 26 carries an identical latching mechanism 36 made according to the invention at the inner end thereof for preventing movement of the rear tie-down devices 32 as will be explained hereinafter.

As seen in FIGS. 2 and 3, each tie-down device 32 comprises a generally L-shaped body portion 38 which includes a vertically orientated leg 42 integrally formed with a generally horizontal leg 44. The upper or head end of the leg 42 merges with a pair of identical and converging ribs 45 which also extend below the leg 44. The ribs serve as reinforcement members for the legs 42 and 44. A mounting member 46 is rigidly formed with the upper end of leg 42 and is located along a horizontal axis. The mounting member 46 is cylindrical in cross-section with a stepped diameter and is adapted to be received by a pair of axially aligned circular openings 48 and 50 respectively formed in laterally spaced and vertically orientated side plates 52 and 54 of frame 20.

The leg 44 is defined by downwardly inclined outer surfaces 56 and 57 below the mounting member member 46 and has the outer end thereof integrally formed with an enlarged vertically orientated section 58 which rigidly supports a shoe member composed of a pair of oppositely extending and horizontally orientated arms 60 and 62 as seen in FIG. 3. As sen in FIG. 4, the leading and trailing edges of the shoe member are tapered and, as best seen in FIG. 3, the shoe member is adapted to be located within the guide rail when the vehicle is in the container 10.

From the above description, it should be apparent that each tie-down device 32 is attachable to the frame 20 by inserting the mounting member 46 into the apertures 48 and 50 formed in the frame adjacent the tire as seen in FIG. 3. In instances where the tire does not block the apertures in the frame, the attaching operation is accomplished by inserting the mounting member 46 along a horizontal axis directly into the apertures. If, however, the apertures are partially blocked by the tire, it is possible to tilt the tie-down device 32 relative to the frame so that the small diameter portion of the mounting member 46 passes through the large aperture 48 initially with the longitudinal axis of the mounting member being moved along a tilted axis and then pivoted clockwise so the small diameter portion can be inserted into the small aperture 50.

As aforementioned, each latching mechanism 36 serves to maintain the tie-down device 32 in a fixed position and accordingly prevent the vehicle from moving in a fore and aft direction. In this regard, it will be noted that each latching mechanism 36 comprises a lock lever 64 which is L-shaped and includes a lock leg 66 and a handle leg 68. A base member 70, which is C-shaped in cross-section and is an extension of the associated guide rail, serves to support the lock lever 64 through a vertically orientated pivotal connection 72 so as to allow the lock lever 64 to pivot about a vertical axis between the full line position wherein the tie-down device is restrained from movement and the phantom line position wherein the tie-down device is movable rearwardly along the longitudianl axis of the guide rail. The lock leg 66 is formed with a U-shaped opening which includes parallel and axially spaced stop surfaces 74 and 76 which are located on opposite sides of the tie-down device to prevent fore and aft movement of the latter when the lock lever 64 is in the full line position of FIG. 2.

The top surface of the lock lever 64 adjacent the U-shaped opening is provided with a wedged shaped member 78 which is supported for pivotal movement by a vertical pin 80 carried by the lock leg 66. The member 78 has an inclined upper surface 82 which is adapted to engage the similarly inclined surface 57 of the tie-down device when the lock lever is pivoted counterclockwise from the phantom line position to the full line position as seen in FIG. 2. The member 78 is sized so when it is located in the FIG. 3 position, it causes the body portion of the tie-down device to be forcibly pressed into physical contact with the side plate 52 of the frame and at the same time caused the tie-down device to be raised vertically so that the arms 60 and 62 thereof contact the upper portion of the guide rail. Thus, with the lock lever placed in the locked position, the tie-down device is continuously maintained in a fixed position relative to the guide rail and serves to rigidly restrain the vehicle frame 20 from movement.

It will be noted that the movement of the lock lever 64 between the aforesaid positions is realized through a handle 84, one end of which is secured to the handle leg 68 while the other end extends rearwardly towards the open end of the container 10 for manual movement by a person. The length and cross-sectional size of the handle is such that allows sufficient flexibility in the handle so that the outer end thereof can be trapped in a bracket 86 rigidly secured to the floor portion 18 when the lock lever 64 is in the full line or locked position of FIGS. 2 and 3.

Various changes and modifications can be made in this construction without departing from the spirit of the invention. Such changes and modifications are contemplated by the inventors and they do not wish to be limied except by the scope of the appended claims.

The embodiments of the invention in which an exclusive property or privilege is claimed are defined as follows:

1. A latching mechanism for a vehicle tie-down device having an upper end formed with a projecting member which is received within an aperture in the side of a vehicle frame and has a lower end formed with a shoe member which is received by an elongated guide rail, comprising a base member located adjacent said guide rail, a lock lever formed with a pair of spaced stop surfaces, means connecting the lock lever to said base member for movement between a first position wherein said stop surfaces are located fore and aft of said tie-down device so that said tie-down device is restrained from movement along the longitudinal axis of the guide rail and a second position wherein said stop surfaces are spaced from the tie-down device to allow movement of said tie-down device along said longitudinal axis, means mounted on the lock lever for engaging the tie-down device and causing the latter to be forced laterally against the side of the frame and raised vertically against the guide rail to maintain the tie-down device in a fixed position when the lock lever is in the first position, and means for locking said lock lever in said first position.

2. A latching mechanism for a vehicle tie-down device having an upper end formed with a projecting member which is received within an aperture in the side of a vehicle frame and has a lower end formed with a shoe member which is received by an elongated guide rail, comprising a base member located at the end of said guide rail, a lock lever formed with an opening which defines a pair of spaced stop surfaces, means pivotally connecting the lock lever to said base member for movement between a first position wherein said stop surfaces are located fore and aft of said tie-down device so that the tie-down device is restrained from movement along the longitudinal axis of the guide rail and a second position wherein said stop surfaces are spaced from the tie-down device to allow movement of the tie-down device along said longitudinal axis, means pivtally mounted on the lock lever for engaging the tie-down device and causing the latter to be forced laterally against he side of the frame and raised vertically against the guide rail to maintain the tie-down device in a fixed position when the lock lever is in the first position, and means for locking said lock lever in said first position.

3. A latching mechanism for a vehicle tie-down device having an upper end formed with a horizontally projecting member which is received within an aperture in the side of a vehicle frame and has a lower end formed with a shoe member which is received by an elongated guide rail, comprising a base member located at one end of said guide rail, in longitudinal alignement therewith, a lock lever formed with a U-shaped opening which defines a pair of spaced stop surfaces, means connecting the lock lever to said base member for pivotal movement about a vertical axis so the lock lever is movable between a first position wherein said stop surfaces are located fore and aft of said tie-down device so that the tie-down device is restrained from movement along the longitudinal axis of the guide rail and a second position wherein said stop surfaces are spaced laterally from the tie-down device to allow movement of the tie-down device along said longitudinal axis, a wedged-shaped member, means pivotally supporting said wedge-shaped member on the lock lever adjacent said opening and between said stop surfaces so the wedge-shaped member engages the tie-down device and causes the tie-down device to be forced laterally against the side of the frame and raised vertically against the guide rail to maintain the tie-down device in a fixed position when the lock lever is in the first position, and means for locking said lock lever in said first position.

* * * * *